US012444467B2

(12) United States Patent
Kim et al.

(10) Patent No.: US 12,444,467 B2
(45) Date of Patent: Oct. 14, 2025

(54) SEMICONDUCTOR MEMORY DEVICE PERFORMING A MULTIPLICATION AND ACCUMULATION OPERATION

(71) Applicants: SK hynix Inc., Icheon (KR); Korea Advanced Institute of Science and Technology, Daejeon (KR)

(72) Inventors: Kyunghyun Kim, Daejeon (KR); Seonghwan Cho, Daejeon (KR)

(73) Assignees: SK hynix Inc., Icheon (KR); Korea Advanced Institute of Science and Technology, Daejeon (KR)

( * ) Notice: Subject to any disclaimer, the term of this patent is extended or adjusted under 35 U.S.C. 154(b) by 211 days.

(21) Appl. No.: 18/148,333

(22) Filed: Dec. 29, 2022

(65) Prior Publication Data

US 2024/0013835 A1    Jan. 11, 2024

(30) Foreign Application Priority Data

Jul. 7, 2022 (KR) .................. 10-2022-0083924
Dec. 6, 2022 (KR) .................. 10-2022-0168923

(51) Int. Cl.
*G11C 16/04* (2006.01)
*G11C 7/10* (2006.01)
(Continued)

(52) U.S. Cl.
CPC ........ *G11C 16/0483* (2013.01); *G11C 7/1006* (2013.01)

(58) Field of Classification Search
CPC ... G11C 16/0483; G11C 7/1006; G11C 11/54; G11C 16/24; G06N 3/063
See application file for complete search history.

(56) References Cited

U.S. PATENT DOCUMENTS 11,061,646 B2   7/2021  Sumbul et al.
2014/0185362 A1* 7/2014  Haukness .......... G11C 13/0097
                                                    365/148

(Continued)

FOREIGN PATENT DOCUMENTS

KR   1020110111180 A    10/2011
KR   1020210029070 A     3/2021
WO   WO2022260413 A1 * 12/2022   ............... G06N 3/04

OTHER PUBLICATIONS

Toshiba, NAND Flash Applications Design Guide, Toshiba America Electronic Components, Inc., Revision 1.0, 1-29 (Year: 2003).*

*Primary Examiner* — Sultana Begum
*Assistant Examiner* — Elizabeth Rose Agger

(57) ABSTRACT

A semiconductor memory device includes a cell array including a plurality of memory cells connected between a first bit line and a source line; a computation control circuit configured to control a first bit line current between the first bit line and the source line during a computation operation; and an output circuit including a first computation capacitor whose charge amount is changed according to the first bit line current during the computation operation, wherein an amount of charge that flows between the first bit line and the source line during the computation operation depends on both data stored in a memory cell among the plurality of memory cells according to a first data and a voltage of a word line connected to the memory cell provided according to a second data.

12 Claims, 5 Drawing Sheets

(51) Int. Cl.
*G11C 16/24* (2006.01)
*G06N 3/063* (2023.01)
*G11C 11/54* (2006.01)

(56) References Cited

U.S. PATENT DOCUMENTS

| | | | | |
|---|---|---|---|---|
| 2019/0362787 A1* | 11/2019 | Lu | .................. | G11C 13/0069 |
| 2022/0342640 A1* | 10/2022 | Tsukamoto | ............ | H10B 51/20 |
| 2023/0078079 A1* | 3/2023 | Atallah | ................ | G11C 11/412 |
| | | | | 706/22 |

* cited by examiner

SEMICONDUCTOR MEMORY DEVICE PERFORMING A MULTIPLICATION AND ACCUMULATION OPERATION

CROSS-REFERENCE TO RELATED APPLICATION

The present application claims priority under 35 U.S.C. § 119(a) to Korean Patent Application No. 10-2022-0083924, filed on Jul. 7, 2022, and Korean Patent Application No. 10-2022-0168923, filed on Dec. 6, 2022, which are incorporated herein by reference in its entirety.

BACKGROUND

1. Technical Field

Various embodiments relate to a semiconductor memory device performing a multiplication and accumulation (MAC) operation.

2. Related Art

Neural networks are widely used in artificial intelligence applications, such as image recognition and technologies used in autonomous vehicles.

In an example, a neural network includes an input layer, an output layer, and one or more inner layers between the input layer and the output layer.

Each of the output layer, the input layer, and the inner layers includes one or more neurons. Neurons contained in adjacent layers are connected in various ways through synapses. For example, synapses may point from neurons in a given layer to neurons in a next layer. Alternately or additionally, synapses may point to neurons in a given layer from neurons in a previous layer.

Each of the neurons stores a value. The values of the neurons included in the input layer are determined according to an input signal, for example, an image to be recognized. The values of the neurons contained in the inner and output layers are based on the neurons and synapses contained in corresponding previous layers. For example, the values of the neurons in each of the inner layers are based on the values of the neurons in a preceding layer in the neural network.

Each of the synapses has a weight. The weight of each of the synapses is based on a training operation of the neural network.

After the neural network is trained, the neural network can be used to perform an inference operation. In the inference operation, the values of the neurons in the input layer are set based on an input, and the values of the neurons in the next layers (e.g., the inner layers and the output layer) are set based on the values of the neurons in the input layer and the weights of the trained synapses connecting the layers. The values of the neurons in the output layer represent a result of the inference operation.

For example, in an illustrative inference operation in which image recognition is performed by the neural network after the neural network has been trained, the values of the neurons in the input layer are set based on an input image, a plurality of operations are performed at the inner layers based on the values of the neurons in the input layer and weights of synapses connecting each inner layer to a preceding layer, and a result of the image recognition is output by the output layer based on values of neurons of a last inner layer and weights of synapses connecting the output layer to the last inner layer.

In such an inference operation, a large number of Multiply-Accumulate (MAC) operations must be performed by the neurons in the convolutional neural network. As a result, a semiconductor device that can efficiently perform a large number of MAC operations is desired.

SUMMARY

In accordance with an embodiment of the present disclosure, a semiconductor memory device may include a plurality of memory cells connected between a first bit line and a source line; a computation control circuit configured to control a first bit line current between the first bit line and the source line to have a constant value during a computation operation; and an output circuit including a first computation capacitor whose charge amount is changed according to the first bit line current during the computation operation, wherein an amount of charge that flows between the first bit line and the source line during the computation operation depends on both data store in a memory cell among the plurality of memory cells according to a first data and a voltage of a word line connected to the memory cell provided according to a second data.

BRIEF DESCRIPTION OF THE DRAWINGS

The accompanying figures, wherein like reference numerals refer to identical or functionally similar elements throughout the separate views, together with the detailed description below, are incorporated in and form part of the specification, and serve to further illustrate embodiments that include various features, and explain various principles and beneficial aspects of those embodiments.

DETAILED DESCRIPTION

Various embodiments will be described below with reference to the accompanying figures. Embodiments are provided for illustrative purposes and other embodiments that are not explicitly illustrated or described are possible. Further, modifications can be made to embodiments of the present disclosure that will be described below in detail.

Figure 1:
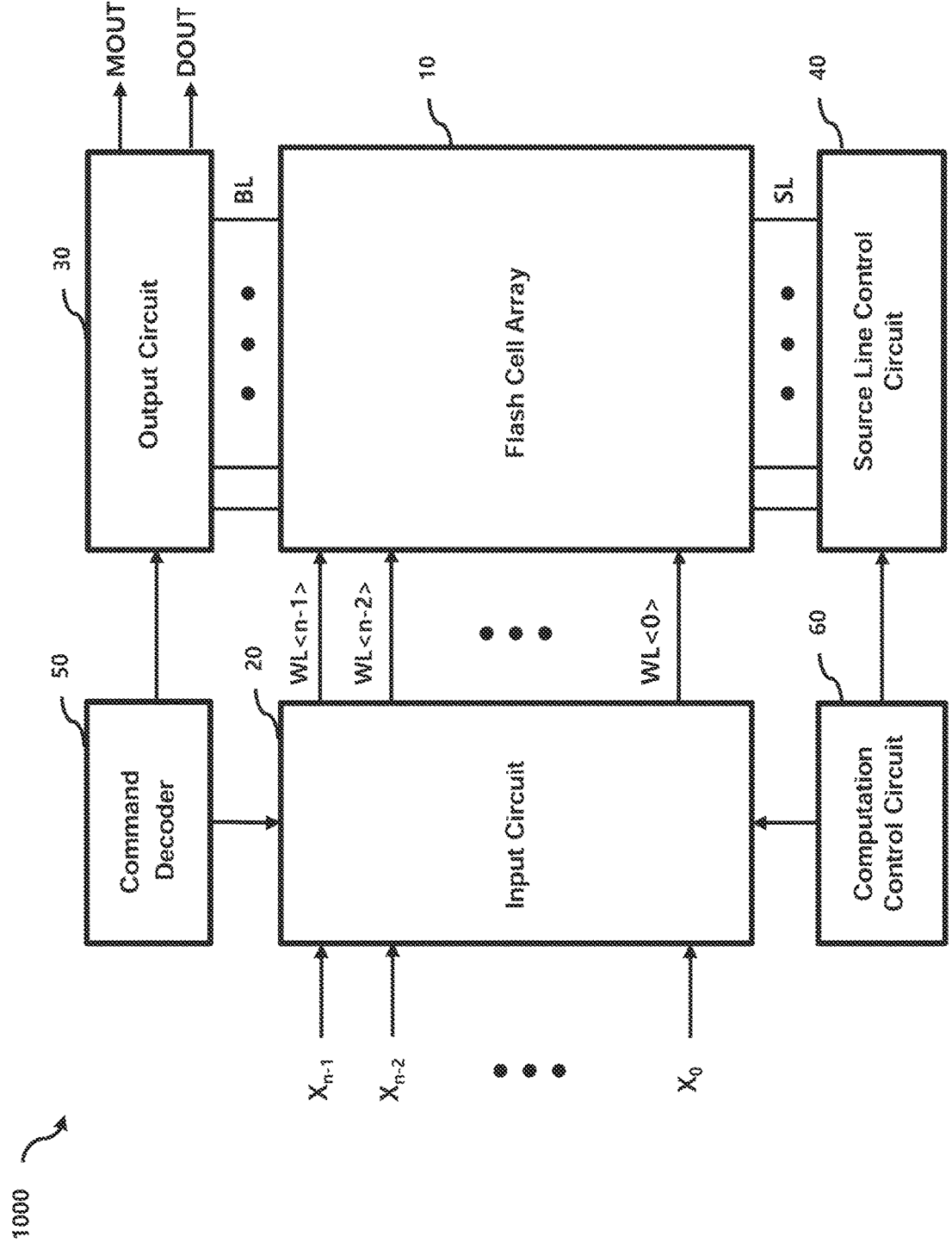
FIG. 1 is a block diagram of a semiconductor memory device according to an embodiment of the present disclosure.

FIG. 1 is a block diagram illustrating a semiconductor memory device 1000 according to an embodiment of the present disclosure.

Hereinafter, a semiconductor memory device will be disclosed using a NAND flash memory device as an example, but embodiments are not limited thereto.

The semiconductor memory device 1000 includes a flash cell array 10, an input circuit 20, an output circuit 30, a source line control circuit 40, and a command decoder 50.

The flash cell array 10 includes a plurality of NAND strings, the structure of which will be described in detail with reference to FIG. 2.

The input circuit 20 provides word line voltages of flash memory cells included in a plurality of NAND strings.

In the present embodiment, the semiconductor memory device 1000 performs read/write operations the same manner as a conventional flash memory device.

Accordingly, since an operation of programming data at the requested address in the flash cell array 10 by generating word line voltages at the input circuit 20 corresponding to input signals $X_0, X_1, \ldots, X_{n-1}$ provided to the input circuit 20 is the same as that of the related art, a detailed description thereof will be omitted.

In addition, since an operation of generating word line voltages at the input circuit 20 to read data of a requested address and outputting the data provided from the flash cell array 10 through the output circuit 30 is the same as in the related art, a detailed description thereof is also omitted.

This embodiment relates to performing a MAC operation on first data and second data. The first data and the second data are vector data each including a plurality of elements.

In the MAC operation, corresponding elements of the first data and the second data are multiplied and multiplication results are accumulated.

Hereinafter, the first data may be referred to as input data I and the second data may be referred to as weight data W. In embodiments described herein, each element of the input data is 2-bit data and each element of the weight data is 1-bit data, but embodiments are not limited thereto. For example, in some embodiments, each element of the input data I may be 1-bit data, 3-bit data, or 4-or-more-bit data.

In a first embodiment described herein, each element of the weight data W has a value of 0 or 1. In a second embodiment described herein, each element of the weight data W may have a value of −1 or 1. In a third embodiment described herein, each element of the weight data W may be trinary data having a value of −1, 0, or 1. However, embodiments are not limited to the disclosed embodiments.

In the present embodiment, the input data I is programmed to the flash cell array 10 by a programing operation before performing the MAC operation.

In the present embodiment, the weight data W is input during the MAC operation.

During the MAC operation, the input signals $X_0, X_1, \ldots, X_{n-1}$, corresponding to the weight data W are provided to the input circuit 20 and the input circuit 20 generates word line voltages according to the input signals.

As aforementioned, each element of the weight data W is 1-bit data and an i-th input signal $X_i$ has a value 0 or 1 according to an i-th element $W_i$ of the weight data W.

For example, when the i-th input signal Xi is 1, the input circuit 20 provides a normal read voltage to an i-th word line WL<i>, but when the i-th input signal Xi is 0, the input circuit 20 provides a ground voltage to the i-th word line WL<i>.

Controlling the word line voltages according to the weight data W is disclosed in detail with reference to FIG. 4 below.

In the first embodiment, the output circuit 30 provides data stored in the flash cell array 30 as output data DOUT, which is the same as in the related art. Bit line voltages may be controlled in the output circuit 30, which will be disclosed below. Controlling a bit line voltage as a power supply voltage VDD or a ground voltage GND during a programming operation or a read operation is the same as in the related art.

The output circuit 30 further outputs the MAC operation result, which will be described in detail below.

The source line control circuit 40 is a circuit that controls a current to a source line SL connected to the flash cell array 10.

The command decoder 50 controls the data input/output operation by controlling the flash cell array 10, the input circuit 20, the output circuit 30, and the source line control circuit 40 according to a command and an address.

Since the memory input/output operation is the same as that of the related art, a description thereof will be omitted.

The computation control circuit 60 controls the flash cell array the input circuit 20, the output circuit 30, the source line control circuit 40, and the command decoder 50 while controlling a MAC operation.

Figure 2:
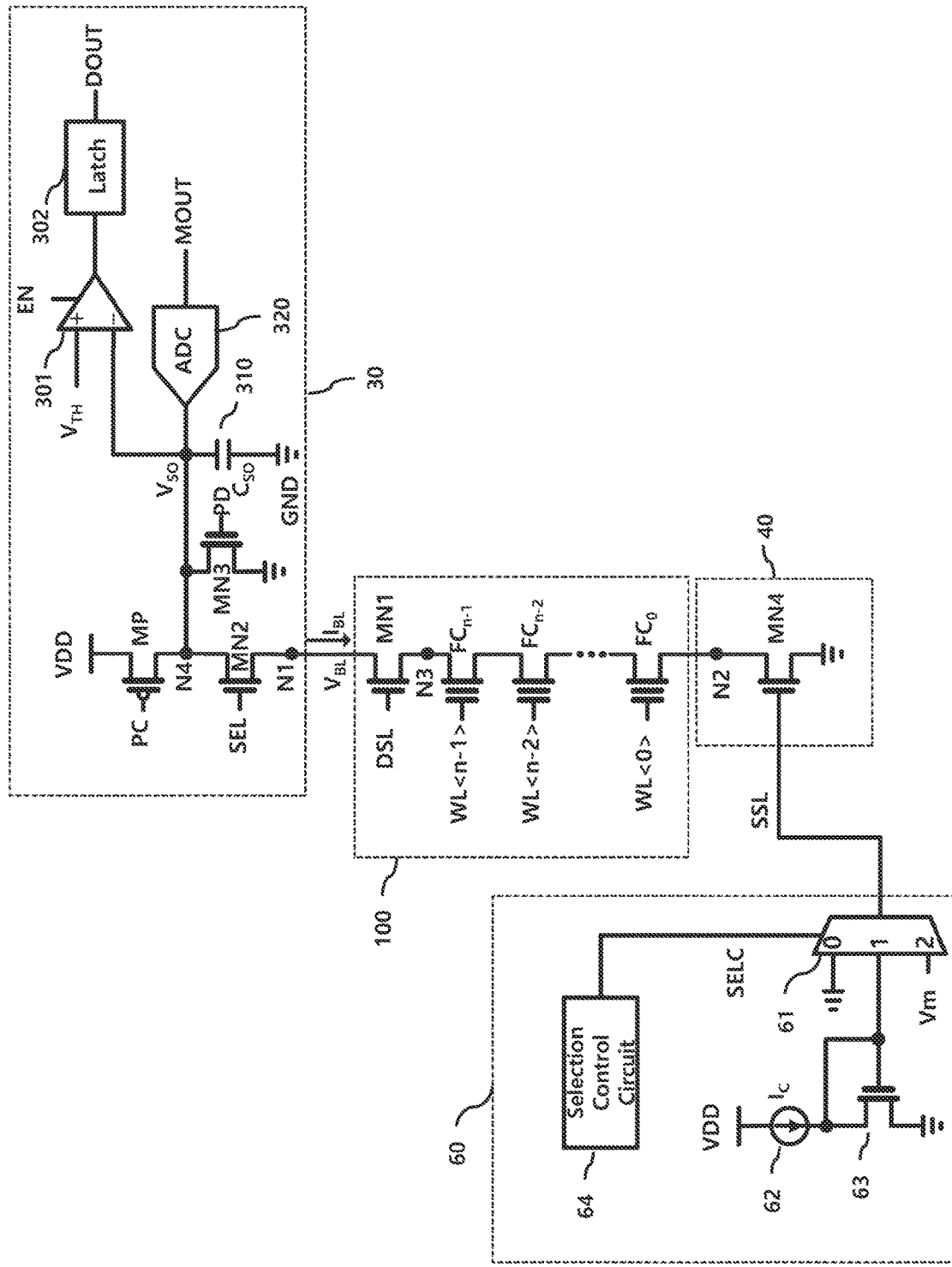
FIG. 2 illustrates circuits of a semiconductor memory device according to an embodiment of the present disclosure.

FIG. 2 illustrates a circuit of the semiconductor memory device 1000 of FIG. 1.

The flash cell array 10 includes a plurality of NAND strings 100 arranged in two or three dimensions as in the related art.

The NAND string 100 is connected between a first node N1 and a second node N2.

The first node N1 is connected to a bit line BL. One bit line BL may be connected to a plurality of NAND strings 100 through the first node N1.

The second node N2 may be connected to a source line SL, and the source line SL may be connected to the second power source GND through a transistor MN4.

The voltage of the first node N1 is expressed as a bit line voltage $V_{BL}$, and current flowing through the first node N1 is expressed as a bit line current $I_{BL}$.

The NAND string 100 includes a first switch MN1 connected between the first node N1 and a third node N3.

In the present embodiment, the first switch MN1 is an NMOS transistor whose gate is controlled by a drain select line DSL, and has a drain and a source connected to the first node N1 and the third node N3, respectively.

A plurality of flash memory cells $FC_0, FC_{n-2}$, and $FC_{n-1}$ are connected in series between the third node N3 and the second node N2.

A word line WL<i> is connected to a control gate of the flash memory cell $FC_i$, wherein i is one of $0, 1, \ldots,$ and n−1 and n is a natural number.

The output circuit 30 includes a second switch MP connected between the first power source VDD and a fourth node N4, and a third switch MN2 connected between the fourth node N4 and the first node N1. The output circuit 30 further includes a fourth switch MN3 connected between the fourth node N4 and the second power source GND. The third switch MN3 may provide the ground voltage GND to the bit line BL.

In this embodiment, the second switch MP is a PMOS transistor MP where a precharge signal PC is applied to a gate thereof, the third switch MN2 is an NMOS transistor where a selection signal SEL is applied to a gate thereof, and the fourth switch MN3 is an NMOS transistor where a pull-down signal PD is applied to a gate thereof. During a read operation and a program operation of the flash cell array 100, the second switch MP, the third switch MN2, and the fourth switch MN4 may be controlled to set the voltage of the bit line BL. Setting the voltage of the bit line during a read operation or a program operation is the same as the related art.

The output circuit 30 includes a comparator 301 and a latch 302 to provide output data DOUT during a conventional read operation of the flash memory device 1000.

The comparator 301 compares an output voltage of the fourth node N4 with a threshold voltage VTH according to an activation signal EN, and the latch 302 latches an output of the comparator 301 to generate the output data DOUT.

In this embodiment, the output circuit 30 includes a computation capacitor 310 connected between the fourth node N4 and the second power source GND.

In this embodiment, the precharge signal PC and the selection signal SEL are set to a low level before the beginning of the MAC operation. This causes the second switch MP to be turned on, and the third switch MN2 to be turned off, so that the computation capacitor 310 is charged.

After the MAC operation is completed, the operation result may be determined using a charging voltage $V_{SO}$ of the computation capacitor 310, which will be described in detail below.

The output circuit 30 further includes an analog-to-digital converter (ADC) 320 which converts the charging voltage $V_{SO}$ into a digital signal to provide a computation output MOUT.

The source line control circuit 40 includes a transistor MN4 connected between the second node N2 and the second power source GND.

In this embodiment, the transistor MN4 is an NMOS transistor where a source line selection signal SSL is applied to a gate thereof.

The computation control circuit 60 includes a voltage selection circuit 61, a constant current source 62, a diode-connected transistor 63, and a selection control circuit 64.

The voltage selection circuit 61 provides a voltage selected according to the selection control signal SELC provided from the selection control circuit 64 as the source line selection signal SSL to the gate of the transistor MN4.

The selection control circuit 64 controls the voltage selection circuit 61 to provide the respective voltages at its "0" or "1" inputs to the source line selection signal SSL during the MAC operation, and controls the voltage selection circuit 61 to provide the voltage at its "2" input to the source line selection signal SSL during a normal memory operation such as a read or a write operation.

A voltage provided as the source line control signal SSL during a read operation, an erase operation, and a write operation of the flash memory device (that is, the voltage at the "2" input of the voltage selection circuit 61) is expressed as a memory operation voltage $V_m$.

The memory operation voltage $V_m$ may be provided at different voltages depending on a type of memory operation as described in the related art such as in Korean Patent Publication No. 10-2011-0111180 A, and accordingly a detailed description thereof will be omitted.

Figure 3A:
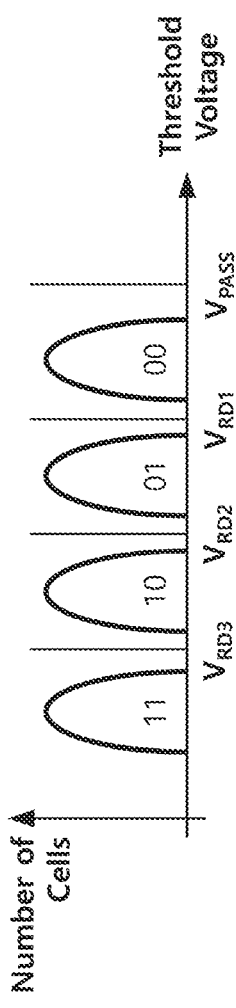
FIGS. 3A and 3B illustrate read operations of semiconductor memory devices according to an embodiment of the present disclosure.
Figure 3B:
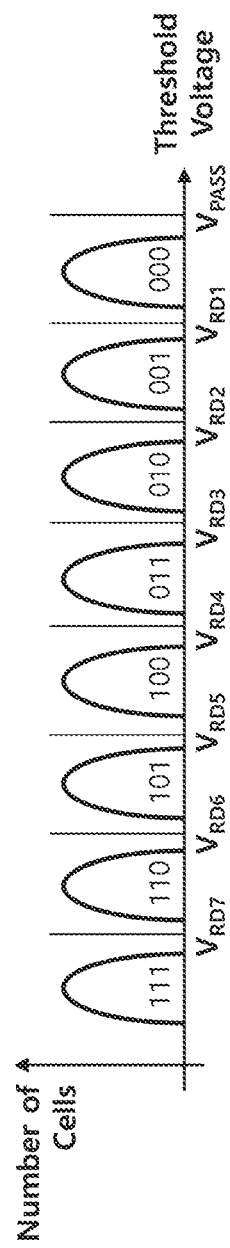

FIGS. 3A and 3B illustrate aspects of read operations of a flash memory device 1000. In particular, FIG. 3A illustrates aspects of a read operation of a memory cell storing two bits of data, and FIG. 3B illustrates aspects of a read operation of a memory cell storing three bits of data. In FIGS. 3A and 3B, curved lines indicate a distribution of threshold voltages of memory cells storing the value shown inside each curve. In flash memory, the threshold voltage of each memory cell is determined by the amount of charge stored therein, but embodiments are not limited thereto.

In both cases, a pass voltage $V_{PASS}$ is applied to word lines connected to unselected flash memory cells in the NAND string, that is, to the unselected word lines.

Next, a series of read voltages are sequentially applied to a word line connected to a selected flash memory cell, that is, to the selected word line, which cause a change in a bit line connected to the selected flash memory cell.

For example, considering the two-bit per cell (MLC) example in FIG. 3A, when data stored in the selected flash memory cell corresponds to "10", a change in a voltage or current of the bit line connected to the selected flash memory cell may occur when $V_{RD1}$ and $V_{RD2}$ are provided as a read voltage because $V_{RD1}$ and $V_{RD2}$ are higher than the threshold voltage of the selected flash memory cell, but no change may occur on the bit line when $V_{RD}3$ is provided. Accordingly, it may be determined that data stored in the flash memory cell is "10". The three-bit-per-cell (TLC) example of FIG. 3B operates similarly, as would be known to a person of ordinary skill in the art.

Hereinafter, in FIG. 3A, $V_{RD1}$ is denoted as a first read voltage, $V_{RD2}$ is denoted as a second read voltage, and $V_{RD3}$ is denoted as a third read voltage. Similarly, in FIG. 3B, $V_{RD,1}$ through $V_{RD,7}$ may be denoted as first through seventh TLC read voltages.

In the first embodiment described herein, the MAC operation uses a read operation of a flash memory cell. Hereinafter, a MAC operation in accordance with the first and second embodiments will be described with reference to FIGS. 2 and 4.

Figure 4:
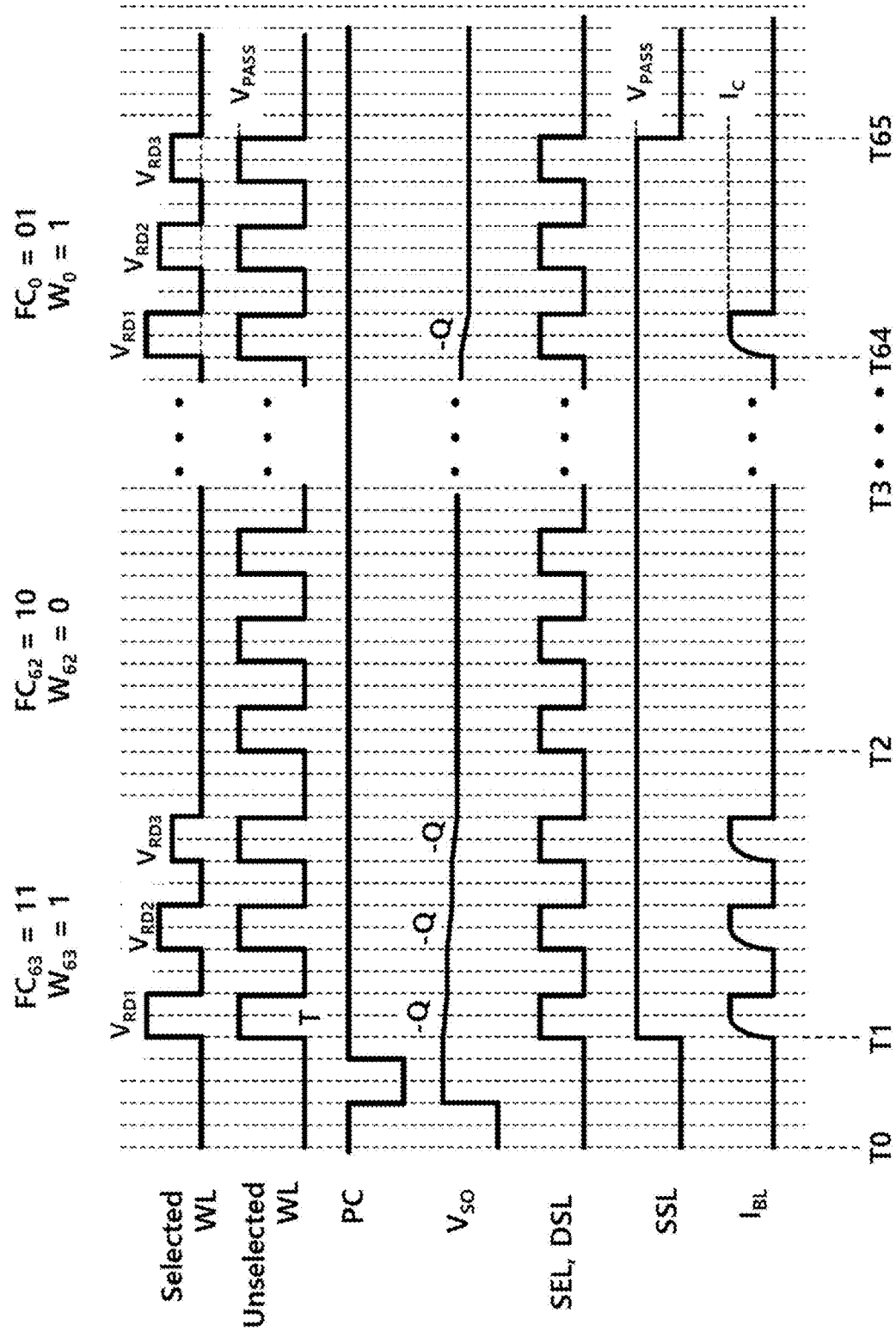
FIG. 4 is a timing diagram illustrating a MAC operation of a semiconductor memory device according to an embodiment of the present disclosure.

FIG. 4 is a timing diagram illustrating a MAC operation of a semiconductor memory device 1000 according to embodiments of the present disclosure.

As described above, in the first embodiment, before performing the MAC operation, each of the plurality of flash memory cells included in the NAND string 100 stores a corresponding element of the first data.

In FIG. 4, the MAC operation includes a precharge stage performed between T0 and T1 and a discharge stage performed between T1 and T65.

In the precharge stage, the computation capacitor 310 is charged by setting the precharge signal PC to the low level for a predetermined time and turning on the second switch MP.

In addition, both the selection signal SEL and the drain selection signal DSL are set to the low level, so that the first switch MN1 and the third switch MN2 are also turned off. The fourth switch MN3 is turned off during the MAC operation. Accordingly the pull-down signal PD is kept to a low level, which is not shown in FIG. 4.

The capacitance of the computation capacitor 310 is indicated by $C_{SO}$, and the charging voltage of the computation capacitor 310 is indicated by $V_{SO}$.

During the precharge stage, the selection control circuit 64 outputs "0", and accordingly, the transistor MN4 is turned off.

In the discharging stage, the second switch MP is turned off, and the first switch MN1, the third switch MN2, and the transistor MN4 are turned on.

During the discharge stage, the selection control circuit 64 outputs a signal indicating "1" to the source line control circuit 40, and accordingly, the transistor MN4 operates as a current mirror.

Accordingly, during the discharge stage, the bit line current $I_{BL}$, if any, mirrors the cell current $I_C$ provided by the constant current source 62. In some embodiments, the bit line current $I_{BL}$ may be related to the cell current $I_C$ by a scaling constant determined by the relative properties of the diode-connected transistor 63 and the transistor MN4.

Thereafter, in the first second embodiments, read operations are sequentially performed on the flash memory cells included in the NAND string as described below.

A read operation on the flash cell $FC_{63}$ is performed between T1 and T2.

The input data I corresponding to the flash memory cell $FC_{63}$ is "11", and therefore, the flash memory cell $FC_{63}$ stores "11".

The weight data $W_{63}$ corresponding to the flash memory cell $FC_{63}$ is "1". Therefore, the first read voltage $V_{RD1}$, a second read voltage $V_{RD2}$, and a third read voltage $V_{RD3}$ are sequentially provided to the control gate of the flash memory cell $FC_{63}$, and the pass voltage $V_{PASS}$ is applied to gates of unselected flash memory cells for a read operation.

In FIG. 4, a word line connected to a flash memory cell in which a read operation is performed is indicated as a selected word line, and a word line connected to an unselected flash memory cell is indicated as an unselected word line.

In some embodiments, the first switch MN1 and the third switch MN2 are turned on only when a read voltage is provided, and the bit line current $I_{BL}$ flows only in this time interval. In other embodiments, the first switch MN1 and the third switch MN2 are turned on from before each time the first read voltage $V_{RD1}$ is provided until after each third read voltage $V_{RD3}$ is provided.

Referring to FIG. 3A, when the data of the flash memory cell $FC_{63}$ is "11", the flash memory cell $FC_{63}$ is turned on for all of the first to third read voltages.

When the flash memory cell $FC_{63}$ is in a on state, a bit line current $I_{BL}$, which corresponds to a cell current $I_C$ provided by the constant current source 62, flows, and accordingly, a corresponding amount of charge Q is discharged from the computation capacitor 310.

Accordingly, during a read operation for the flash memory cell $FC_{63}$ between times T1 and T2, a total charge of 3Q is discharged.

A read operation is performed on the flash memory cell $FC_{62}$ between times T2 and T3. Accordingly, before time T2, the word line connected to the flash memory cell $FC_{62}$ becomes the selected word line, and the word line connected to the flash memory cell $FC_{63}$ becomes one of the unselected word lines.

The read data corresponding to the flash memory cell $FC_{62}$ is "10" and therefore, the flash cell $FC_{62}$ stores "10".

The weight data $W_{62}$ corresponding to the flash memory cell $FC_{62}$ is "0". Therefore, the ground voltage is provided to the control gate of the flash memory cell $FC_{62}$, and the pass voltage $V_{PASS}$ is applied to the gates of unselected flash memory cells for a read operation, so that no charge is discharged from the computation capacitor 310 between times T2 and T3.

After sequentially performing read operations flash cell $FC_{61}$ through $FC_1$ in the time between times T3 and T64 (not shown), a read operation is performed on the flash cell $FC_0$ between times T64 and T65. The read data corresponding to the flash cell $FC_0$ is "01", and therefore, the flash memory cell $FC_0$ stores "01".

The weight data W0 corresponding to the flash memory cell FC0 is "1". Therefore, for a read operation, a first read voltage VRD1, a second read voltage VRD2, and a third read voltage VRD3 are sequentially provided to the control gate of the flash memory cell FC0 while the pass voltage VPASS is applied to gates of the other flash memory cells in the NAND string for a read operation.

Referring to FIG. 3A, when the data of the flash memory cell $FC_0$ is "01", the flash memory cell $FC_0$ is turned on only for the first read voltage $V_{RD1}$.

Accordingly, during a read operation on the flash memory cell FC0 between times T64 and T65, charge Q is discharged.

After time T65, the first switch MN1, the second switch MP, the third switch MN2, and the transistor MN4 are turned off, so that the computation capacitor 310 is in a floating state.

At this time, the charging voltage $V_{SO}$ of the computation capacitor 310 is expressed by Equation 1.

$$V_{SO} = \frac{(C_{SO} \times V_{DD}) - \sum_{i=0}^{n-1}((I_i \times W_i) \times I_C \times T)}{C_{SO}} \quad \text{[Equation 1]}$$

In Equation 1, I denotes input data, W denotes weight data, and T denotes a time interval where a read voltage is provided.

In Equation 1, the MAC operation result between the input data and the weight data corresponds to the second term of the numerator.

Accordingly, a MAC operation result between the input data and the weight data may be calculated using the computation output MOUT in the precharge stage and the computation output MOUT after the discharge stage.

Figure 5:
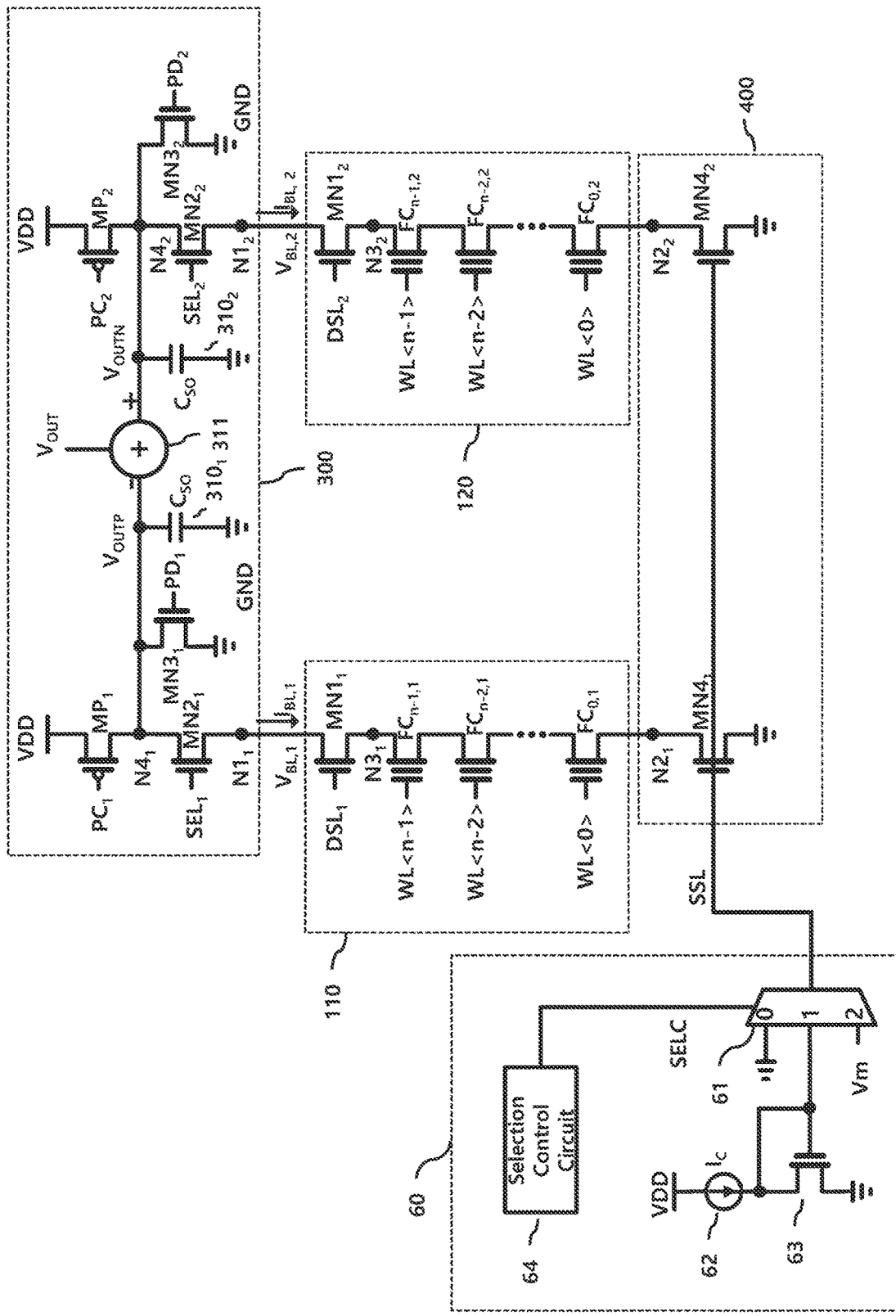
FIG. 5 illustrates circuits of a semiconductor memory device according to other embodiments of the present disclosure.

FIG. 5 shows a semiconductor memory device according to other embodiments of the present invention.

In the first embodiment described with reference to FIG. 2, each element of the weight data W is given as 0 or 1. In contrast, in second embodiment that will be described with reference to FIG. 5, each element of the weight data W is given as 1 or −1.

In the second embodiment corresponding to FIG. 5, a first NAND string 110 and a second NAND string 120 that are connected with different bit lines are used. The first NAND string 110 and the second NAND string 120 store the same input data I.

For example, when n is 4, the weight data is considered as {1, 1, −1, −1}, and the input data is considered as {d1, d2, d3, d4}. Then, the first NAND string 110 and the second NAND string 120 stores {d1, d2, d3, d4}.

The host generates first write request for writing {d1, d2, d3, d4} in the first NAND string 110 and generates second write request for writing {d1, d2, d3, d4} in the second NAND string 120.

As described above, since the write operation itself on the first NAND string 110 and the second NAND string 120 is a conventional technique, a detailed description thereof will be omitted.

The first NAND string 110 and the second NAND string 120 have the same structure as the NAND string 100 of FIG. 2.

Accordingly, in the first NAND string 110 and the second NAND string 120, the same reference numerals as those of FIG. 2 are used, and subscripts are used to distinguish corresponding NAND strings.

A first weight data provided to the first NAND string 110 and a second weight data provided to the second NAND string 120 are determined from the weight data W.

In this embodiment, the first weight data is determined by setting negative elements of the weight data as 0, and the second weight data is determined by setting positive elements of the weight data as 0 and by setting the negative elements of the weight data as 1.

Accordingly, the first weight data provided to the first NAND string 110 is {1, 1, 0, 0}, and the second weight data provided to the second NAND string 120 is {0, 0, 1, 1}.

Performing the MAC operation while providing the word line voltages according to the first weight data to the first NAND string 110 storing the input data is the same as that described with reference to FIG. 4. In addition, performing the MAC operation while providing the word line voltages according to the second weight data to the second NAND string 120 in which the input data is stored is the same as that described with reference to FIG. 4.

The output circuit 300 is an extension of the output circuit 30 of FIG. 2 and further includes a voltage calculation circuit 311.

Elements in the output circuit 300 of FIG. 5 corresponding to the output circuit 30 of FIG. 2 use the same reference numerals, but use different subscripts to distinguish corresponding NAND strings.

That is, the output circuit 300 includes a second switch $MP_1$, a third switch $MN2_1$, a fourth switch $MN3_1$, and a positive computation capacitor $310_1$ corresponding to the first NAND string 110, and a second switch $MP_2$, a third switch $MN2_2$, a fourth switch $MN3_2$, and a negative computation capacitor $310_2$ corresponding to the second NAND string 120.

The capacitance of the two computation capacitors $310_1$ and $310_2$ may be the same as $C_{SO}$. When the charging voltage of the positive operational capacitor $310_1$ is expressed as the first output voltage $V_{OUTP}$ and the charging voltage of the negative operational capacitor $310_2$ is expressed as the second output voltage $V_{OUTN}$, the voltage calculation circuit 311 generates an output voltage $V_{OUT}$ by subtracting the first output voltage $V_{OUTP}$ from the second output voltage $V_{OUTN}$.

The source line control circuit 400 and the computation control circuit 60 is substantially the same as in the first and second embodiments described with reference to FIG. 2 except that the source line control circuit 400 includes a first transistor $MN4_1$ corresponding to the first NAND string 110 and a second transistor $MN4_2$ corresponding to the second NAND string 120.

When the MAC operation as shown in FIG. 4 is completed for each of the first NAND string 110 and the second NAND string 120, the first output voltage $V_{OUTP}$ is expressed as Equation 2, and the second output voltage $V_{OUTN}$ is expressed as in Equation 3.

$$V_{OUTP} = \frac{C_{SO} \times V_{DD} - \sum_{i=0}^{n-1}(I_i \times W1_i) \times I_c \times T}{C_{SO}} \quad \text{[Equation 2]}$$

In Equation 2, $W1_i$ corresponds to 1 when $W_i$ is 1 and to 0 when $W_i$ is $-1$.

$$V_{OUTN} = \frac{C_{SO} \times V_{DD} - \sum_{i=0}^{n-1}(I_i \times W2_i) \times I_c \times T}{C_{SO}} \quad \text{[Equation 3]}$$

In Equation 3, $W2_i$ corresponds to 1 when $W_i$ is $-1$ and to 0 when $W_i$ is 1.

From Equations 2 and 3, the output voltage $V_{OUT}$ of the voltage calculation circuit 311 is expressed as Equation 4.

$$V_{OUT} = V_{OUTN} - V_{OUTP} \quad \text{[Equation 4]}$$
$$= \frac{\sum I_i \times (W1_i - W2_i) \times I_c \times T}{C_{SO}}$$
$$= \frac{\sum I_i \times W_i \times I_c \times T}{C_{SO}}$$

It can be seen from Equation 4 that when the weight data is 1 or $-1$, the output voltage $V_{OUT}$ of the voltage calculation circuit 311 corresponds to the MAC operation result using the input data I and the weight data W.

In a third embodiment according to FIG. 5, the weights $W_0$ to $W_{n-1}$ are trinary weights each having a respective value selected from $-1$, 0, or 1. The operation of the third embodiment is similar to that described for the second embodiment, with the additional feature that for both the first partial MAC operation and the second partial MAC operation, the ground voltage is provided to a selected word line when the weight corresponding to the selected word line has a value of "0." Similar to as described for the second embodiment, the difference between the voltage on the positive operational capacitor $310_1$ and voltage of the negative operational capacitor $310_2$ therefore corresponds to the result of the MAC operation using the input data $\{d_0, \ldots, d_{n-2}, d_{n-1}\}$ and the trinary weights $W_0$ to $W_{n-1}$.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. A semiconductor memory device comprising:
   a cell array including a plurality of memory cells connected between a first bit line and a source line, the plurality of memory cells being connected to a plurality of word lines, respectively;
   a computation control circuit configured to control a first bit line current between the first bit line and the source line to have a constant value during a computation operation; and
   an output circuit including a first computation capacitor whose charge amount is changed according to the first bit line current during the computation operation,
   wherein an amount of charge that flows between the first bit line and the source line during the computation operation depends on both data stored in a memory cell among the plurality of memory cells according to a first data and a voltage of a word line connected to the memory cell provided according to a second data,
   wherein the computation operation includes a multiplication and accumulation (MAC) operation having a result corresponding to a sum of respective products of elements of the first data and elements of the second data,
   wherein the MAC operation is performed by reading each of the plurality of memory cells storing a value corresponding to an element of the first data by providing a word line voltage determined according to a corresponding element of the second data and a read voltage which is selected from one or more threshold voltages used to determine values stored in corresponding memory cells, and wherein a voltage of the first computation capacitor corresponds to a result of a MAC operation of the first data and the second data after the computation operation.

2. The semiconductor memory device of claim 1, wherein the output circuit includes a switch configured to connect a first voltage source and the first computation capacitor according to a precharge signal; and a switch configured to connect the first bit line and the first computation capacitor according to a selection signal.

3. The semiconductor memory device of claim 2, wherein the output circuit further includes an analog-to-digital converter (ADC) configured to convert a voltage of the first computation capacitor into a digital signal.

4. The semiconductor memory device of claim 2, wherein the first computation capacitor is connected to the first bit line during the computation operation after the first computation capacitor is precharged.

5. The semiconductor memory device of claim 1, further comprising a transistor configured to control the first bit line current according to a source line control signal,
wherein the transistor operates as a current mirror to produce the constant value of the first bit line current during the computation operation.

6. The semiconductor memory device of claim 1, wherein the cell array includes a NAND string including a plurality of flash memory cells connected in series and a switch configured to connect a terminal of the NAND string with the first bit line according to a drain selection signal.

7. The semiconductor memory device of claim 6, further comprising an input circuit configured to control word line voltage provided to each flash memory cell in the NAND string according to a respective element of the second data.

8. The semiconductor memory device of claim 1,
wherein the cell array includes:
a first NAND string connected between the first bit line and the source line, and
a second NAND string connected between a second bit line and the source line;
wherein the computation control circuit is configured to control a second bit line current between the second bit line and the source line to have a constant value during the computation operation;
wherein the output circuit includes a second computation capacitor whose charge amount is changed according to the second bit line current during the computation operation; and
wherein a result of the computation operation corresponds to a difference between a voltage of the first computation capacitor and a voltage of the second computation capacitor.

9. The semiconductor memory device of claim 8, wherein the output circuit includes:
a switch configured to connect a first voltage source and the first computation capacitor;
a switch configured to connect the first bit line and the first computation capacitor;
a switch configured to connect the first voltage source and the second computation capacitor; and
a switch configured to connect the second bit line and the second computation capacitor.

10. The semiconductor memory device of claim 8, wherein the first computation capacitor is connected to the first bit line during the computation operation after the first computation capacitor is precharged and the second computation capacitor is connected to the second bit line during the computation operation after the second computation capacitor is precharged.

11. The semiconductor memory device of claim 8, further comprising:
a first transistor configured to connect the first NAND string to the source line and to operate as a current mirror to control the first bit line current during the computation operation, and
a second transistor configured to connect the second NAND string to the source line and to operate as a current mirror to control the second bit line current during the computation operation.

12. The semiconductor memory device of claim 8,
wherein each element of the first data is stored in a respective memory cell in the first NAND string and in a respective memory cell in the second NAND string;
wherein during the computation operation:
word lines coupled to the memory cells in the first NAND string are provided with one or more read voltages when a value of a corresponding element of second data corresponds to "1" and are not provided with the one or more read voltages when the value of the corresponding element of second data does not correspond to "1", and
word lines coupled to the memory cells in the second NAND string are provided with one or more read voltages when a value of a corresponding element of second data corresponds to "−1" and are not provided with the one or more read voltages when the value of the corresponding element of second data does not correspond to "−1".

* * * * *